United States Patent
Takagi et al.

(10) Patent No.: US 6,888,576 B2
(45) Date of Patent: May 3, 2005

(54) DIGITAL/ANALOG BROADCAST RECEIVING DEVICE CAPABLE OF LIMITING CHANGE IN SETTING IN OPERATION SETTING MENU THEREOF

(75) Inventors: Toshihiro Takagi, Takatsuki (JP); Yoshihisa Nagamura, Daito (JP); Kazuhide Ishihara, Kadoma (JP)

(73) Assignee: Funai Electric Co., Ltd., Daito (JP)

( * ) Notice: Subject to any disclaimer, the term of this patent is extended or adjusted under 35 U.S.C. 154(b) by 501 days.

(21) Appl. No.: 10/077,938

(22) Filed: Feb. 20, 2002

(65) Prior Publication Data

US 2002/0113896 A1 Aug. 22, 2002

(30) Foreign Application Priority Data

Feb. 20, 2001 (JP) .................................. 2001-043254

(51) Int. Cl.[7] .................................................. H04N 5/50
(52) U.S. Cl. ...................................... 348/569; 348/554
(58) Field of Search ................................. 348/569, 564, 348/553, 554, 555, 739; 725/38, 59, 131, 139, 151; 386/83; 345/707

(56) References Cited

U.S. PATENT DOCUMENTS

| | | | | |
|---|---|---|---|---|
| 5,459,488 A | * | 10/1995 | Geiser | 345/173 |
| 5,805,167 A | * | 9/1998 | van Cruyningen | 345/808 |
| 5,856,827 A | * | 1/1999 | Sudo | 345/841 |
| RE37,431 E | * | 10/2001 | Lanier et al. | 706/58 |
| 2002/0055088 A1 | * | 5/2002 | Feig | 434/185 |
| 2003/0001816 A1 | * | 1/2003 | Badarneh | 345/156 |

FOREIGN PATENT DOCUMENTS

JP 05-075947 3/1993

* cited by examiner

Primary Examiner—Victor R. Kostak
(74) Attorney, Agent, or Firm—Crowell & Moring LLP

(57) ABSTRACT

A digital/analog broadcast receiving device has either in a first setting mode (proficient mode) in which whole of setting items can be changed without any limitation and a second setting mode (beginner mode) in which the setting items can be changed with some limitation. The receiving device is set in the second setting mode at the time of shipment from a factory. On the screen displaying thereon a setting menu including setting items for a various operations, such a setting item that cannot be changed is not displayed or prevented from being selected. Thus, the menu items that are desired not to be touched by a beginner user etc. can be prevented from being displayed or selected, so as to improve the operability and also protect the settings.

5 Claims, 6 Drawing Sheets

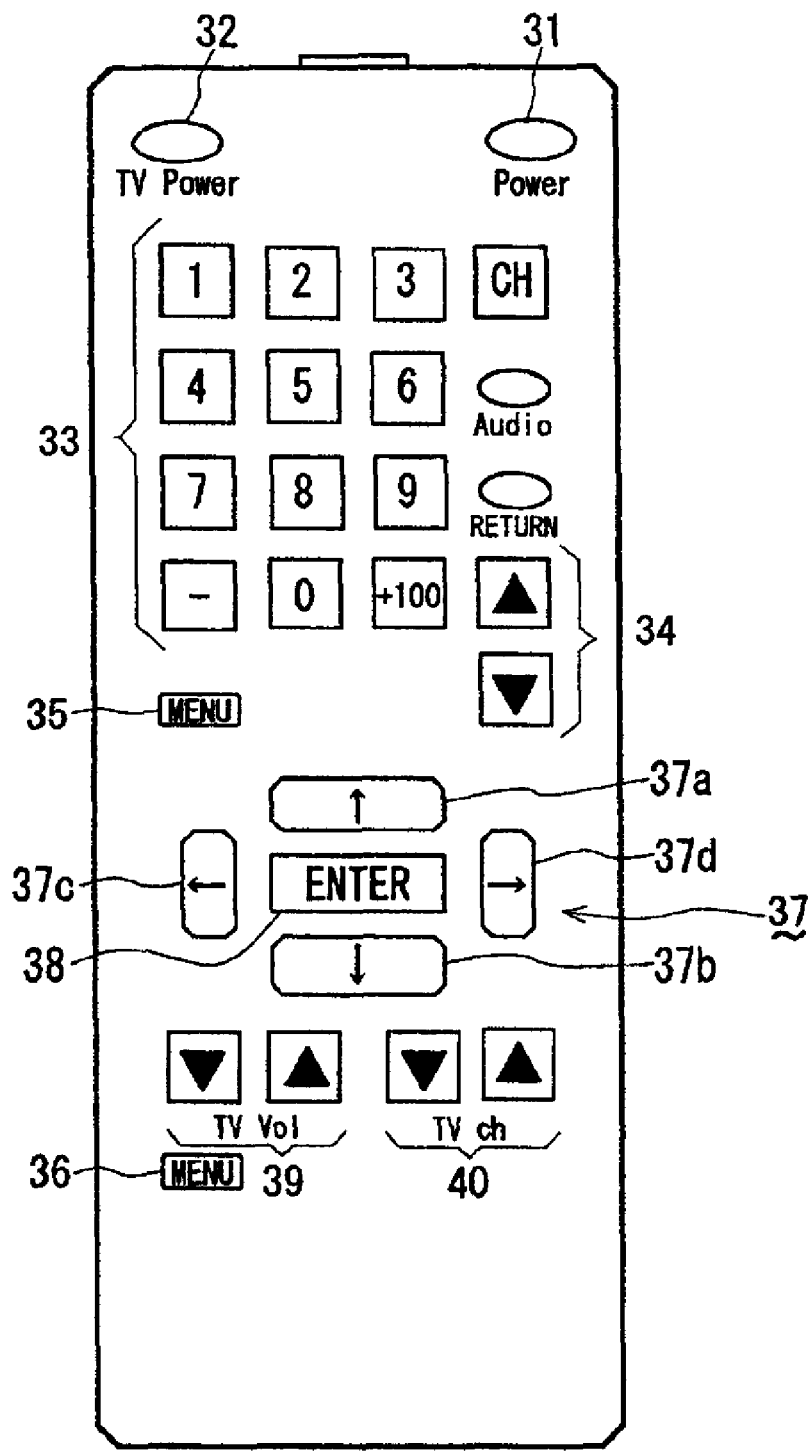

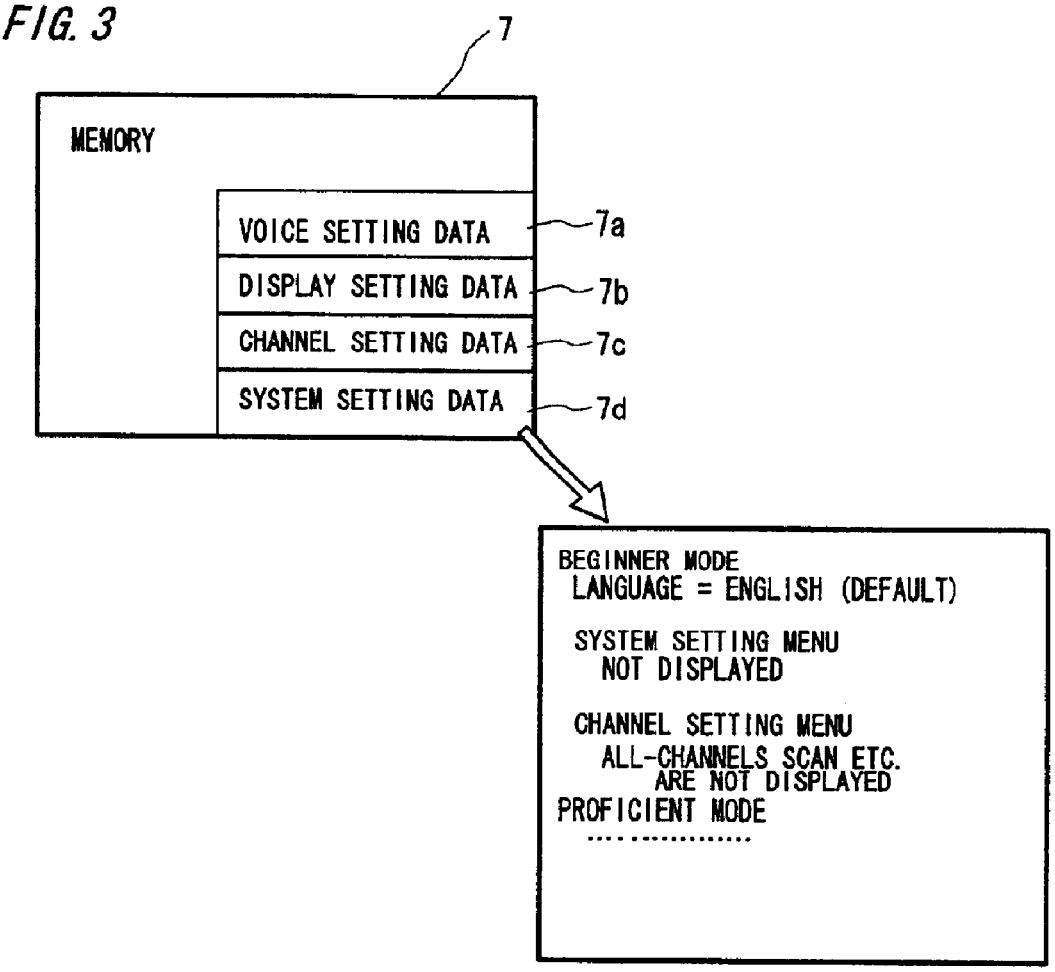

FIG. 4A  MENU DISPLAY IN BEGINNER MODE
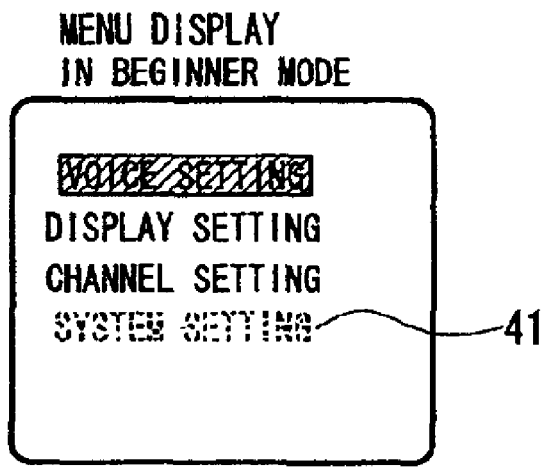
FIG. 4B  MENU DISPLAY IN BEGINNER MODE
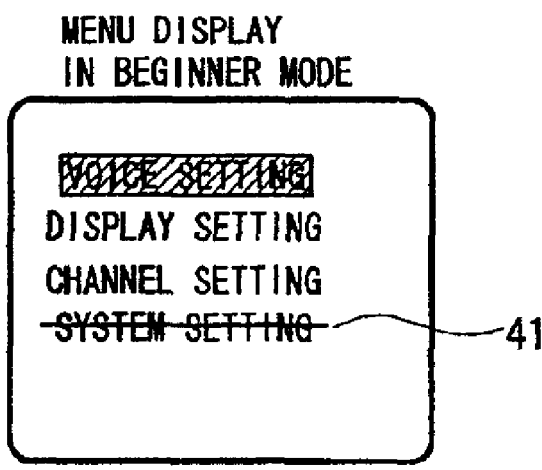
FIG. 4C  MENU DISPLAY IN PROFICIENT MODE
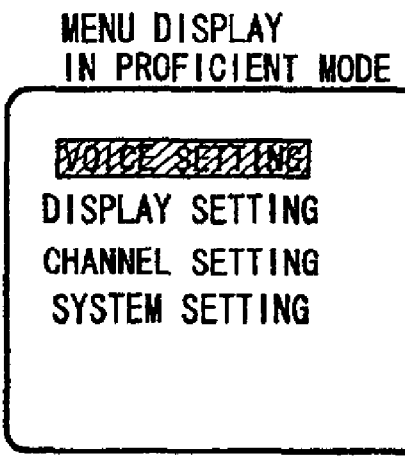

FIG. 5A SETTING DISPLAY IN BEGINNER MODE
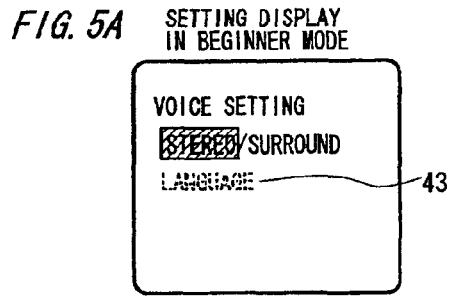
FIG. 5D SETTING DISPLAY IN PROFICIENT MODE
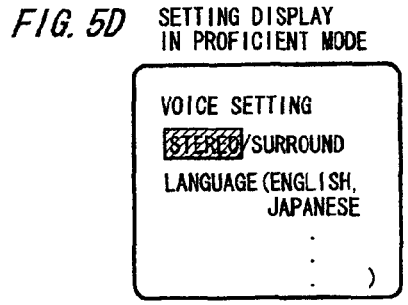
FIG. 5B SETTING DISPLAY IN BEGINNER MODE
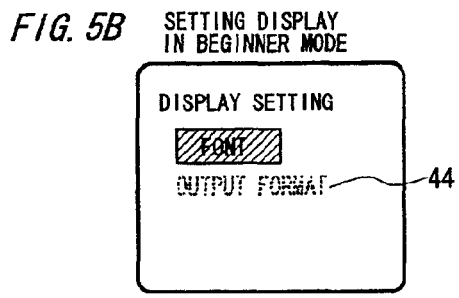
FIG. 5E SETTING DISPLAY IN PROFICIENT MODE
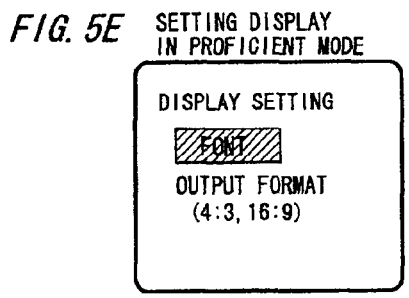
FIG. 5C SETTING DISPLAY IN BEGINNER MODE
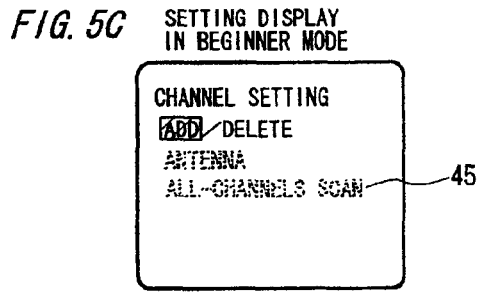
FIG. 5F SETTING DISPLAY IN PROFICIENT MODE
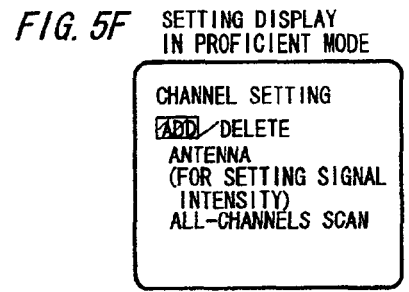
FIG. 5G SETTING DISPLAY IN PROFICIENT MODE
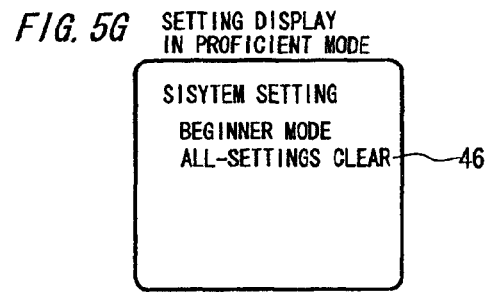
FIG. 6 MODE SWITCH-OVER DISPLAY
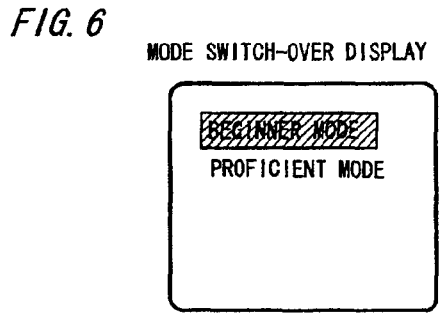

DIGITAL/ANALOG BROADCAST RECEIVING DEVICE CAPABLE OF LIMITING CHANGE IN SETTING IN OPERATION SETTING MENU THEREOF

BACKGROUND OF THE INVENTION

The invention relates to such a receiving device for receiving a digital/analog television broadcast that enables making a various of settings on a screen displaying thereon a setting menu including setting items for a various of operations of the receiving device and, more particularly to, a technology for preventing the setting of an item desired not to be touched by a user unfamiliar with the functions of the device from being changed.

Conventionally, there has been such a television broadcast receiving device available that displays another channel's images at part of a screen thereof or that displays setting items of a various functions in a menu so as to select any of these items by so-called cursor movement. Further, there may be a case where when the source of a video signal is switched from a tuner to a VCR (video cassette recorder), for example, a channel change-over or duplex-voice change-over function which was available in tuner mode before the switch-over is rendered non-available in VCR mode after it; to guard against it, there is such a receiving device that a function item which is rendered non-available in the post-switch-over mode is inhibited from being set and the user is notified of it by, for example, changing the displayed contents, thus improving the operability (see Japanese Unexamined Patent Publication No. 5-75947).

The conventional digital/analog broadcast receiving device has a lot of functions and also many menu items for setting of the operations, so that the user has to take troublesome steps for the setting. Also, there is such a case that if a beginner user etc. touches a setting item in the menu, for example, an item for setting clearing, a preset appropriate setting may be changed or the operations are disturbed, thus making it difficult to repair the situation afterward.

SUMMARY OF THE INVENTION

In view of the above, it is an object of the invention to provide such a digital/analog broadcast receiving device that inhibits a menu item desired not to be touched by a beginner user etc. from being displayed or selected and also that can protect the setting.

The digital/analog broadcast receiving device comprises: a receiver for receiving an encoded digital/analog broadcasting signal originated from a broadcasting station; a digital/analog decoder for decoding the digital/analog broadcasting signal received at the receiver and then outputting the signal to a display which displays an image; a memory for storing set contents relating to a various operations of the receiving device; a control unit for controlling the receiving device according to the set contents stored in the memory; and an input device for inputting a user's channel selecting instruction and the set contents to be stored in the memory to the control unit, in such a configuration that the input device can be used to make settings in a setting menu including setting items for the operations by using a cursor on a screen displayed at the display, wherein: the memory stores therein a first setting mode in which the whole of setting items can be changed without any limitation mainly for a proficient user and a second setting mode in which the setting items can be changed with some limitation mainly for a beginner user, the setting items that cannot be changed as a limitation include an all-settings clearing and the receiving device being set in the second setting mode at the time of shipment from a factory; the receiving device can be switched between the first setting mode and the second setting mode by an operation instruction sent from the input device; and the control unit controls the device so that the setting items which cannot be changed in the second setting mode is either not displayed on the display or prevented from being selected by the input device.

According to the aspect of the invention, the receiving device has two setting modes of a first setting mode in which whole of setting item can be changed without any limitation and a second setting mode in which it can be changed with some limitation, so that when a various settings are made by moving a cursor according to an operational instruction sent from input device on a screen displaying a setting menu including setting items for a various operations, such setting items that cannot be changed, for example, an all-setting clearing item is not displayed or cannot be selected unless the mode is switched because the receiving device is set to the second mode at the time of shipment from the factory. With this, therefore, such menu items that are desired not to be touched by the beginner user are not easily changed in setting to thereby avoid disturbance in operation, thus protecting the settings. Also, the number of the items to be set is reduced, thus simplifying the menu screen.

According to another aspect of the invention, there are two modes available of the first setting mode in which the set item can be changed without any limitation and the second setting mode in which it can be changed with some limitation, so that when a various settings are made by moving the cursor according to an operational instruction sent from the input device on the screen displaying a setting menu including setting items for a various operations, the setting items that cannot be changed are not displayed or cannot be selected as far as the system is in the second setting mode. With this, therefore, such menu items that are desired not to be touched by the beginner user are not easily changed in setting to thereby avoid disturbance in operation, thus protecting the settings. Also, the number of the items to be set is reduced, thus simplifying the menu screen.

According to a further aspect of the invention, the second setting mode is preferentially set when the power is supplied to the receiving device, thus inhibiting such a setting item desired not to be touched from being changed.

BRIEF DESCRIPTION OF THE DRAWINGS

FIG. 2 is a plan view for showing a remote controller which constitutes an input device of the receiving device.

FIG. 3 is illustrations for showing data stored in a memory of the receiving device.

FIGS. 4 are illustrations for showing examples of a menu display.

FIGS. 5 are illustrations for showing examples of a setting display.

FIG. 6 is an illustration for showing a mode switch-over display.

DETAILED DESCRIPTION OF THE PREFERRED EMBODIMENT OF THE PRESENT INVENTION

Figure 1:
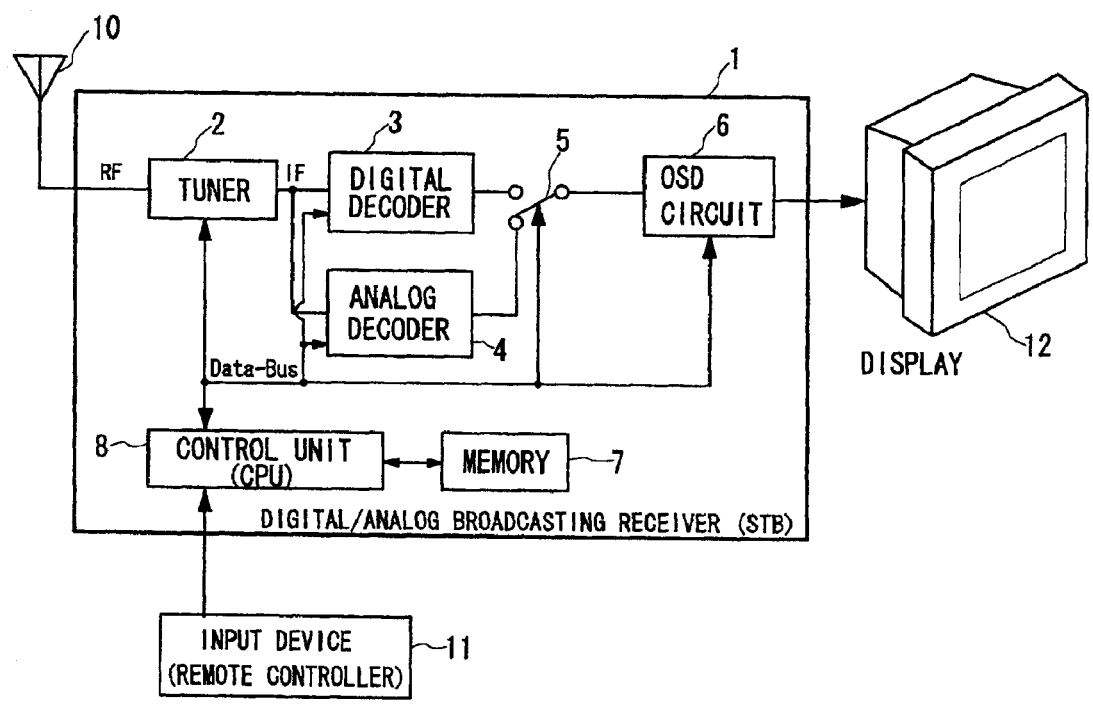
FIG. 1 is a block diagram for showing a digital/analog broadcast receiving device according to one embodiment of the invention.

The following will describe a digital/analog broadcast receiving device related to one embodiment of the invention with reference to the drawings. FIG. 1 shows a block diagram of the digital/analog broadcast receiving device (hereinafter refer to receiving device). The receiving device 1 is a set top box (STB) that receives at an antenna 10 an encoded radio-frequency (RF) digital/analog broadcasting signal originated from a TV broadcasting station to then display a list of the channel information which can be received on a display device 12 (display) for displaying an image signal contained in the broadcasting signal in response to instructions for channel information display input by the user by use of an input device 11 such as the body button or such as a later-described remote controller 30 shown in FIG. 2.

The receiving device 1 comprises a tuner 2 for receiving a digital/analog broadcasting signal which is present in a frequency band corresponding to a desired channel, a digital decoder 3 and an analog decoder 4 for decoding the digital/analog broadcasting signal received at the tuner 2, a switch 5 for switching the broadcasting signal decoded by the digital decoder 3 and the analog decoder 4, an OSD circuit 6 for providing predetermined on-screen display (hereinafter refer to OSD) at a display 12, a memory 7 for storing originating frequencies of each digital broadcasting main channel and channel configuration information, and a control unit 8 consisting of a CPU for controlling the receiving device.

The tuner 2 is supplied with the digital/analog broadcasting signal received through the antenna 10 to then select a channel according to an instruction the user input to the control unit 8 by the input device 11 to thereby receive a digital/analog broadcasting signal in a frequency band corresponding to the input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, physical channels are different in digital broadcasting even using a virtual channel headed by the same number as that of analog broadcasting, so that the broadcasting signal is originated in carrier waves of different frequency bands. When a user-selected channel is of digital broadcasting (if the sub-channels are not of number "0"), the broadcasting signal is decoded by the digital decoder 3. When the user-selected channel is of analog broadcasting (if the sub-channels are of number "0"), the signal is decoded by the analog decoder 4.

The switch 5 receives an instruction from the control unit 8 to then output to the OSD circuit 6 the broadcasting signal decoded by either the digital decoder 3 or the analog decoder 4. The OSD circuit 6 receives an instruction from the control unit 8 to then output the broadcasting signal to the display 12 and also output an OSD display signal for displaying a list of receivable channel information. The memory 7 stores the information of each channel's frequency band and the channel configuration information as well as the information of OSD display at the time of shipment of the receiving device.

The control unit 8 receives a user's input through the input device 11 to then control the sections through a data bus (Data-Bus) and instructs the memory 7 to store the information of each channel's frequency band and the received channel information, thus referring to the information in case of need, for example, when a channel is selected.

Also, the control unit 8 receives a user's instruction for channel changing to then instruct the tuner 2 to receive a broadcasting signal containing channel configuration information and then analyzes a VCT (Virtual Channel Table) given as the channel information obtained by decoding this broadcasting signal at the digital decoder 3, thus obtaining a status signal contained therein. This status signal generally contains information of all digital/analog sub-channels in a virtual main channel. The control unit 8, therefore, can analyze the VCT to thereby obtain virtual channel numbers consisting of the same number (main channel) as the conventional channel number given to the same or the same system of broadcasting station originating the digital/analog broadcasting signal and sub-channel numbers. That is, the control unit 8 can collectively obtain the digital/analog channel information originated from the same or the same system of broadcasting station. The control unit 8 stores thus obtained status signal in the memory 7, thus storing the channel information therein.

Further, the control unit 8, when having received a user's instruction from the input device 11, refers to the data stored in the memory 7 to then indicate a channel information table in OSD on the display 12 and also moves a displayed cursor for channel selection to thereby display a television program of a selected broadcast.

The display 12 may be a display unit of a television, a CRT, or a flat panel display such as an LCD (Liquid Crystal Display) or PDP (Plasma Display Panel). Although not shown, the receiving device 1 is equipped with a D/A converter circuit for converting a digital signal into an analog one so that the signal for the OSD display or image display is converted by this D/A converter circuit into an analog signal and then output to the display 12. Also, the D/A converter circuit may be built in the display 12. When the flat panel display is used, the signal bypasses the D/A converter circuit and is output as digital signal as it is.

The input device 11 is used to input a user's instruction to the control unit 8. The input device 11 may come in the body button provided on the front panel of the receiving device 1 or the remote controller 30 such as shown in FIG. 2. In FIG. 2, the remote controller 30 is adapted to give an instruction in the form of an infrared ray etc. to operate the receiving device 1 and the television, comprising power keys 31 and 32 for turning ON or OFF respectively the power supplies of the receiving device 1 and the television, a numeric key 33 for inputting a channel number of the receiving device 1, a channel UP/DOWN key pair 34 for changing the channel, menu keys 35 and 36 for calling a menu display of the receiving device 1 and the television respectively, keys 37 (37a to 37d) for moving the cursor in any desired directions, an entry (ENTER) key 38 for assuring an input, a sound-volume UP/DOWN key pair 39 for adjusting a sound volume of the television, and a channel UP/DOWN key pair 40 for changing the television channel.

Of the keys 37, the RIGHT/LEFT keys 37c and 37d are assigned for moving the cursor to change the main channel, while the UP/DOWN keys 37a and 37b are assigned for moving the cursor to thereby switch the sub-channel in each main channel. The assignment of the UP/DOWN keys 37a and 37b and the RIGHT/LEFT keys 37c and 37d may be reversed.

Now, a broadcast according to the ATSC (Advanced Television Systems Committee) Standard of North America is described as follows. By the ATSC (Advanced Television Systems Committee) Standard, besides a prior art analog broadcast, there are originated a BS (Broadcasting Satellite) digital broadcast capable of high-picture-quality, multi-channel broadcasting and a digital broadcast represented by the CS (Communications Satellite) digital broadcast, each of which digital broadcasts is originated in a carrier wave in a predetermined frequency band through a physical channel different from that for analog broadcast, thus generally containing many contents. Other digital broadcasts originated from the same broadcasting station or the same system of broadcasting station as the prior art analog broadcasting station are administered so that the station can be selected and displayed through a virtual channel assigned the same channel numbers as the prior art analog broadcasting channel numbers in order to facilitate the operations of the users accustomed to these prior art channel numbers.

The digital broadcasting virtual channels comprise one main channel and sub-channels which are headed by the main channel number to originate one or a plurality of contents, which channels are given in a hierarchy. The configuration of the sub-channels changes with a broadcasting time band often. A channel having sub-channel "0" accommodates an analog broadcast according to the NTSC (National Television Systems Committee) Standard.

Also, channel information can be displayed in the OSD manner as an EPG (Electronic Program Guide) at the display 12 when the user gives an instruction to the control unit 8 using the menu key 35 on the remote controller 30. A broadcasting signal can be decoded and analyzed to obtain a VCT (Virtual Channel Table) containing virtual channel information based on PSIP (Program System Information protocol) and then be stored in a channel map in the memory 7. The user operates the keys on the input device 11 to thereby display based on this channel map at the display 12, thus utilizing it as an interface for changing and selection of channels by the EPG (Electric Program Guide).

The following will describe a configuration and method for setting a various operations of the receiving device 1 with reference to FIGS. 3 to 7. The user operates menu keys 35 and 36 on the input device 11 to thereby instruct the control unit 8 to read out data stored in the memory 7 and display a screen for the various operation setting at the display 12. The memory 7 stores therein, as shown in FIG. 3, such information for setting of a various operations as voice setting data 7a, display setting data 7b, channel setting data 7c, and system setting data 7d, etc. The system setting data 7d contains the contents of the beginner mode (which correspond to the second setting mode) in which the setting items can be changed with some limitation for the unskilled users and the contents of the proficient mode (which correspond to the first setting mode) in which the whole of setting items can be changed without any limitation for the skilled users. In the beginner mode, for example, such items as "SYSTEM SETTING MENU", "ALL-CHANNEL SCAN" therein, etc are not displayed. At the time of shipment from the factory, the receiving device 1 is set to the beginner mode. In the beginner mode also, each of the items is assigned an appropriate initial value.

FIGS. 4A and 4B show two examples of the menu screen in the beginner mode and FIG. 4C shows, an example of the menu screen in the proficient mode. Of the setting items in the menu in the beginner mode, display 41 for "SYSTEM SETTING" is not displayed (which is indicated by a broken line in FIG. 4A) or not selected (which is indicated by an erasing line in FIG. 4B). Although the user can move the cursor (which is indicated by a hatched box) using the keys 37 (37a to 37d) for cursor-operating in OSD to thereby select his desired setting item, "SYSTEM SETTING" cannot be selected in the beginner mode in configuration. In the proficient mode, on the other hand, all of the setting items in the menu can be displayed and selected.

FIGS. 5A, 5B, and 5C show the examples of voice setting, display setting, and channel setting display in the beginner mode, while FIGS. 5D, 5E, 5F, and 5G show the examples of voice setting, display setting, channel setting, and system setting display in the proficient mode. Each of these examples shows the hierarchical details of items selected in the menu of FIG. 4. In the beginner mode, in "VOICE SETTING" on the screen of FIG. 5A, "LANGUAGE" 43 cannot be set, in "DISPLAY SETTING" on the screen of FIG. 5B, "OUTPUT FORMAT" 44 cannot be set, in "CHANNEL SETTING" on the screen of FIG. 5C, "ANTENNA", "ALL-CHANNELS SCAN" 45 cannot be set. These are all assigned an initial value beforehand. In the proficient mode, on the other hand, all of these items can be set; further, in "SYSTEM SETTING" on the screen of FIG. 5G not displayed in the beginner mode, "ALL-SETTINGS CLEAR" 46 can be set. Thus, the setting of such items that are desired not to be touched by the beginners can be changed with some limitation to thereby prevent the beginner from operating "ALL-SETTINGS CLEAR" mistakenly, thus protecting the original setting. The proficient mode and the beginner mode can be switched to each other on such a switch-over screen as shown in FIG. 6.

Figure 7:
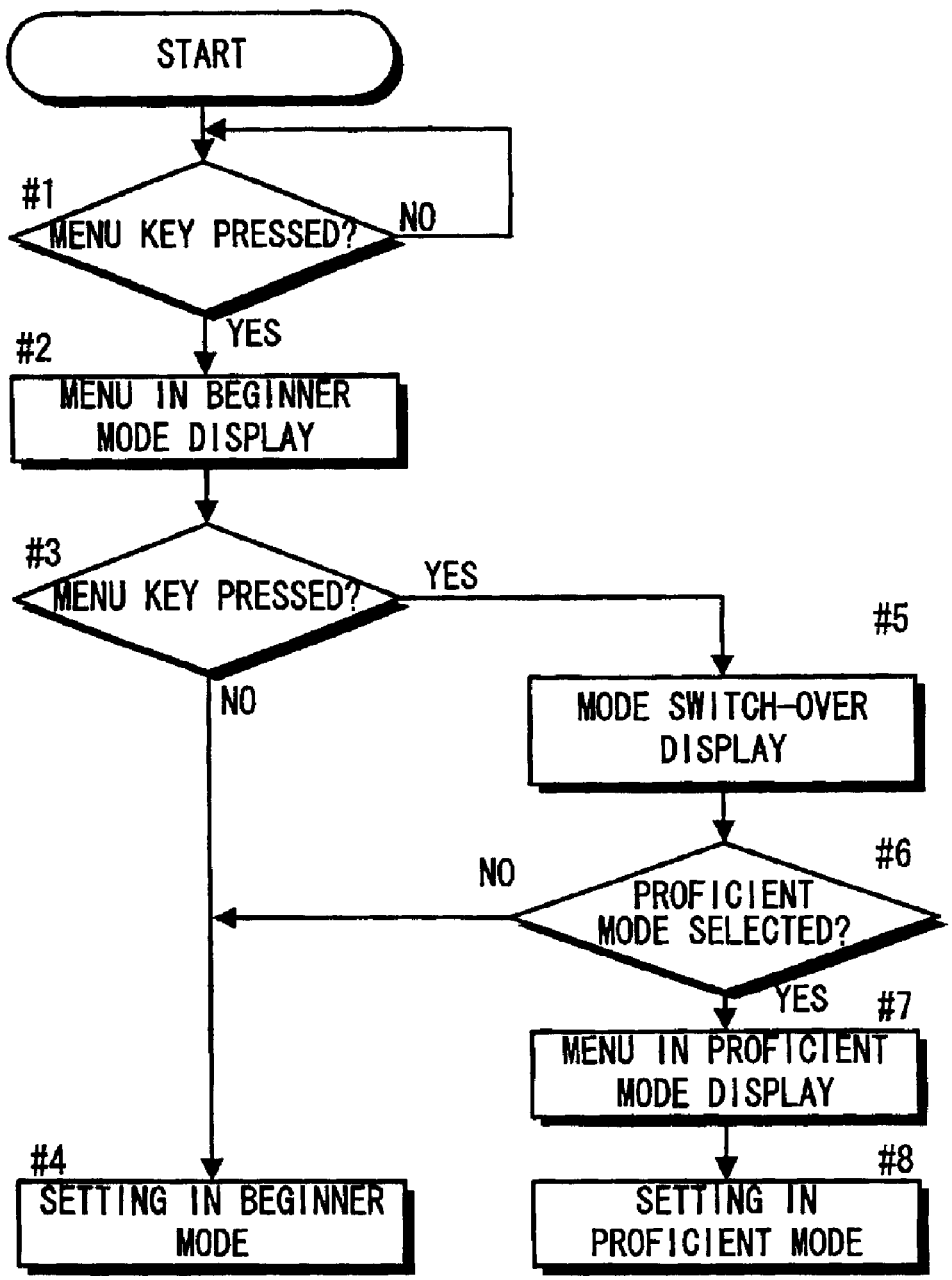
FIG. 7 is a flowchart for showing setting operations in the receiving device.

FIG. 7 shows a processing procedure for displaying the above-mentioned. When the menu key 35 or 36 of the input device 11 is pressed (YES is answered at #1), the menu screen appears in the beginner mode because the receiving device is set in the beginner mode at the time of factory shipment (#2). When neither of the menu key 35 and 36 is pressed again (NO is answered at #3), the setting state in the beginner mode which is shown in FIG. 4A or 4B is set (#4). If the menu key 35 or 36 is pressed again (YES is answered at #3), on the other hand, the mode switch-over screen shown in FIG. 6 appears (#5). When the proficient mode is selected (YES is answered at #6), the menu screen in the proficient mode shown in FIG. 4A appears (#8). When the menu screen has thus appeared, the menu screen in the beginner mode is kept as is unless the setting is changed, so that a menu item that is desired not to be touched by the beginner cannot be changed to thereby avoid disturbances in operation, thus not only protecting the settings but also simplifying the menu screen because the number of the setting items is reduced.

The present invention is not limited to the configuration of the above-mentioned embodiment but may be subject to various changes; for example, the receiving device 1 may be built in the body of a television or a VCR. Although explained is an example in which the items that are limited to change in the beginner mode are not displayed or indicated in a non-selectable mode, those items may be indicated in a half-tone or with a broken line. Also, the beginner mode may be provided for the general users and the proficient mode, for the service men.

What is claimed is:

1. A digital/analog broadcast receiving device comprising:
   a receiver for receiving an encoded digital/analog broadcasting signal originated from a broadcasting station;
   a digital/analog decoder for decoding the digital/analog broadcasting signal received at the receiver and then outputting the signal to a display which displays an image;
   a memory for storing set contents relating to various operations of the receiving device;
   a control unit for controlling the receiving device according to the set contents stored in the memory; and
   an input device for inputting a user's channel selecting instruction and the set contents to be stored in the memory to the control unit, in such a configuration that the input device can be used to make settings in a setting menu including setting items for the operations by using a cursor on a screen displayed at the display, wherein:

the memory stores therein a proficient setting mode in which the whole of setting items can be changed without any limitation and a beginner setting mode in which the setting items can be changed with some limitation, the setting items that cannot be changed as a limitation include an all-settings clearing and the receiving device being set in the beginner setting mode at the time of shipment from a factory;

the receiving device can be switched between the proficient setting mode and the beginner setting mode by an operation instruction sent from the input device; and the control unit controls the device so that the setting items which cannot be changed in the beginner setting mode are either not displayed on the display or prevented from being selected by the input device.

2. A digital/analog broadcast receiving device comprising:

a receiver for receiving an encoded digital/analog broadcasting signal originated from a broadcasting station;

a digital/analog decoding section for decoding the digital/analog broadcasting signal received at the receiver and then outputting the signal to a display which displays an image;

a memory for storing set contents relating to various operations of the receiving device;

a control unit for controlling the receiving device according to the set contents stored in the memory; and an input device for inputting a user's channel selecting instruction and the set contents to be stored in the memory, to the control unit in such a configuration that the input device can be used to make settings in a setting menu including setting items for the operations by using a cursor on a screen displayed at the display to the control unit, wherein:

the memory stores therein a first setting mode in which the whole of setting items can be changed without any limitation and a second setting mode in which the setting items can be changed with some limitation; and the control unit controls the device so that the setting items which cannot be changed in the second setting mode are either not displayed on the display or prevented from being selected by the input device.

3. The digital/analog broadcast receiving device according to claim 2, wherein the second setting mode is set when the power is supplied to the receiving device.

4. The digital/analog broadcast receiving device according to claim 2, wherein the receiving device receives a digital broadcast according to the ATSC (Advanced Television Systems Committee) standard and an analog broadcast according to the NTSC (National Television Systems Committee) standard.

5. The digital/analog broadcast receiving device according to claim 3, wherein the receiving device receives a digital broadcast according to the ATSC (Advanced Television Systems Committee) standard and an analog broadcast according to the NTSC (National Television Systems Committee) standard.

* * * * *